Nov. 11, 1969    C. B. RICHEY    3,477,517
SEMI-MOUNTED PLOW
Filed April 19, 1967    3 Sheets-Sheet 3
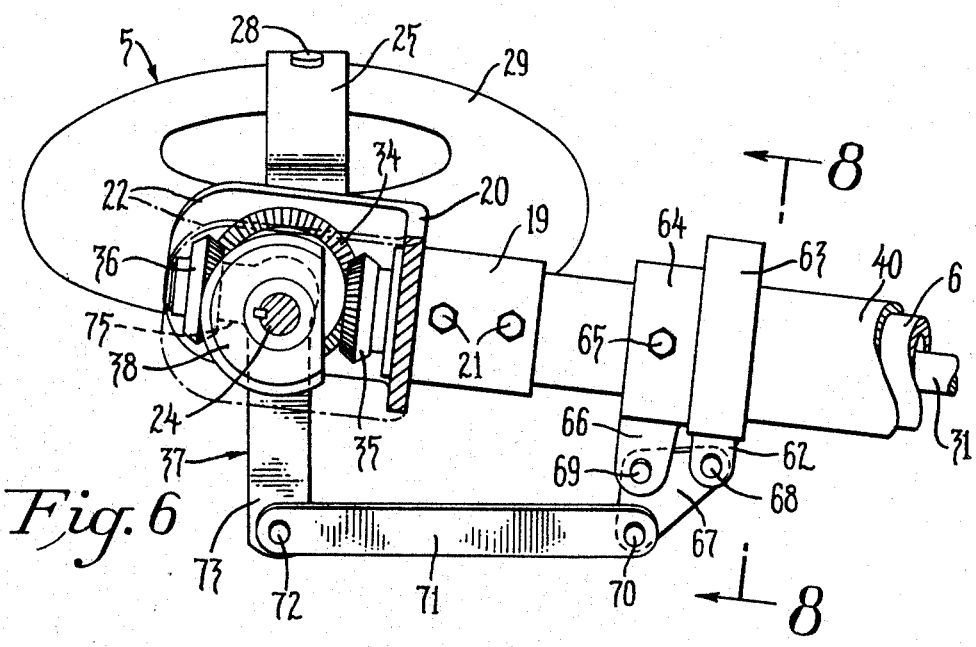
Fig. 6
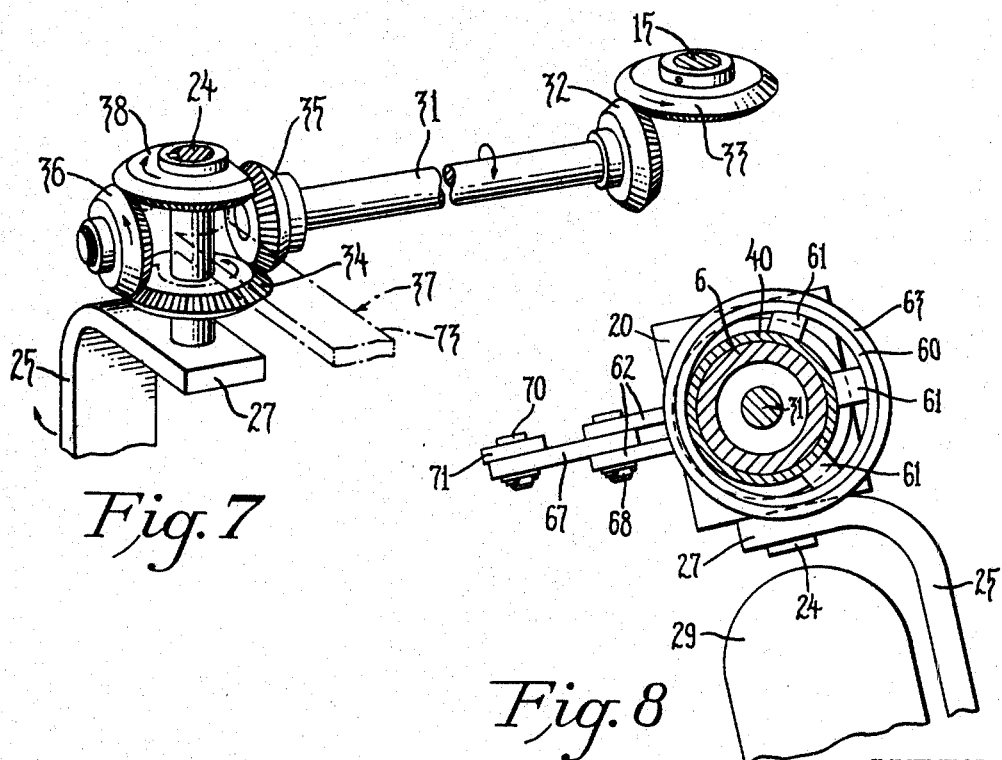
Fig. 7
Fig. 8
INVENTOR.
CLARENCE B. RICHEY
BY Tweedale & Gerhardt
ATTORNEYS.

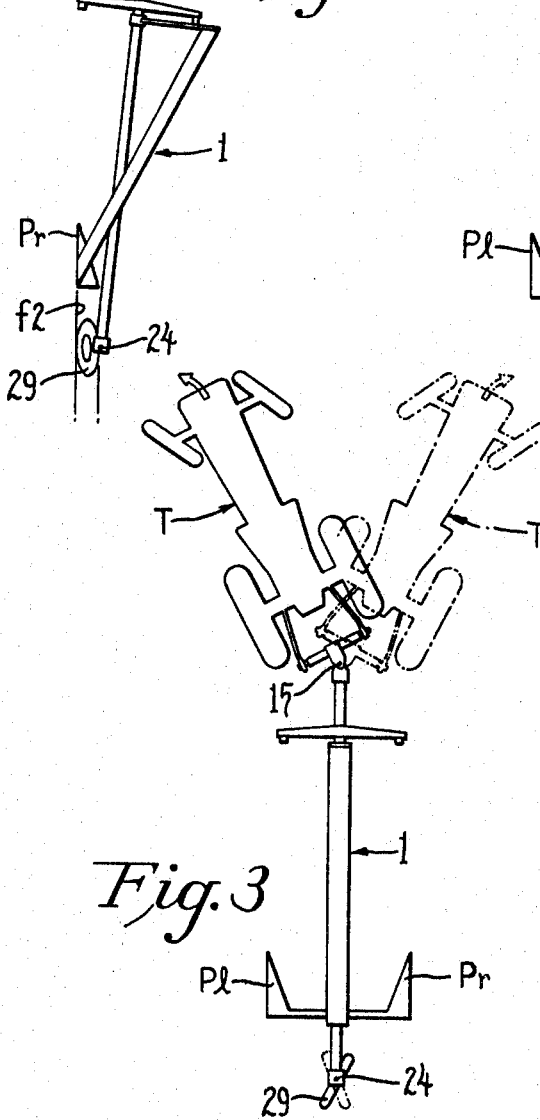

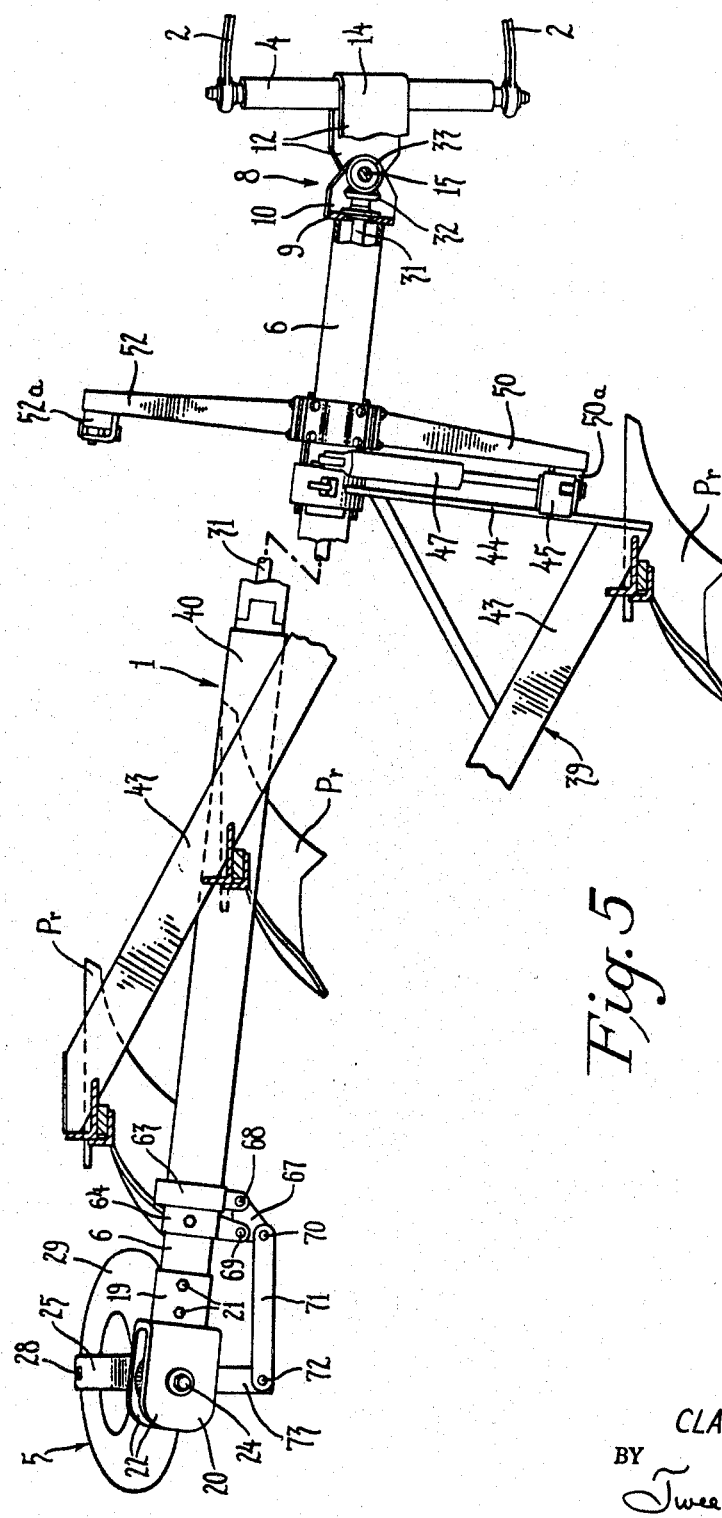

United States Patent Office 3,477,517
Patented Nov. 11, 1969

3,477,517
SEMI-MOUNTED PLOW
Clarence B. Richey, Fresno, Calif., assignor to Massey-Ferguson Inc., Detroit, Mich.
Filed Apr. 19, 1967, Ser. No. 632,009
Int. Cl. A01b 3/28, 3/56, 69/00
U.S. Cl. 172—212                     1 Claim

ABSTRACT OF THE DISCLOSURE

A semi-mounted, two-way, turnover plow having a ground wheel steered in accordance with changes in the direction of a draft vehicle, and interconnected with the turnover plow to cause the wheel to steer the trailing end of the plow respectively to the left or right of the tractor longitudinal axis when the left-hand or right-hand plow bottoms are in plowing positions, and to steer the trailing end of the plow in line with the tractor longitudinal axis when the plows are in transport position.

SUMMARY OF THE INVENTION

My copending U.S. application Ser. No. 524,191, filed Feb. 1, 1966, the entire disclosure of which is incorporated herein by reference, discloses a semi-mounted, turnover plow having a plow frame rotatably mounted on an elongated draft frame member, the trailing end of the draft frame member being supported on a steerable ground wheel. The forward end of the draft frame member is supported for side to side swinging movement on the tractor hitch. The ground wheel is interconnected with the forward connecting means such that changes in direction of the tractor cause corresponding turning movement of the ground wheel to steer the trailing end of the plow in accordance with changes in the direction of the tractor. Moreover, when the plows are in their working positions, the soil forces on the plows include side forces tending to swing the plow to the left or to the right of the tractor longitudinal axis depending upon whether the left or right-hand plow bottoms are in their earthworking position. The ground wheel is interconnected with the plow frame such that rotation of the plow frame to one or the other of its plowing positions causes the ground wheel to turn in a direction relative to the draft frame member in a direction to steer the trailing end of the draft frame member to one side of the longitudinal axis of the tractor in accordance with the action of the soil forces. In the transport position of the plows, the wheel is in line with the tractor longitudinal axis for straight line movement.

In accordance with the present invention, a lever is pivotally mounted on the implement frame and is interconnected with an eccentric on the movable frame supporting the plow bottoms such that the lever is actuated in response to movement of the plow bottoms between positions. Rotatably mounted on the ground wheel spindle is an actuating arm which is connected with the lever through a link. The actuating arm carries a beveled pinion gear which is engaged with gearing on the frame operable to cause the wheel to turn in accordance with changes in the direction of the draft vehicle to which the implement is attached, or in response to movement of the plow bottoms between alternate working positions and their transport position.

BRIEF DESCRIPTION OF THE DRAWINGS

FIGS. 1 through 4 are schematic plan views of the tractor and an implement according to the invention illustrating various modes of operation of the implement;

FIG. 5 is a plan view of an implement embodying the invention in its preferred form;

FIG. 6 is an enlarged plan view, partially in section, of the tail wheel and indexing mechanism embodying the invention;

FIG. 7 is a perspective view of the steering mechanism for the tractor tail wheel; and FIG. 8 is a sectional view taken along lines 8—8 of FIG. 6.

DETAILED DESCRIPTION OF THE PREFERRED EMBODIMENT

FIGS. 1–4 schematically illustrate a multiple bottom turn-over plow 1 drawn by a tractor T. A plurality of oppositely projecting left and right-hand plow bottoms Pl and Pr, respectively, are carried by the implement 1. However, for simplicity of illustration, only the trailing plow bottoms Pr and Pl are shown in FIGS. 1–4. In FIG. 1, the plow is in its right-hand plowing position with the plow bottoms Pr in working position and the plow bottoms Pl in an inoperative position out of engagement with the ground. The right wheels of the tractor T ride in a furrow f1 opened by the trailing plow bottom Pl on the previous pass of the tractor in the opposite direction, such that the tractor and implement are tilted toward the right (as viewed from the rear). The tail wheel of the implement is therefore tilted or canted toward the right to provide resistance to side forces toward the left on the plow. The plow bottom Pr moves earth toward the right as the tractor advances in the direction of the arrow of FIG. 1 and opens a furrow f2 in the ground. The left wheels of the tractor in FIG. 1 ride on unplowed ground.

In FIG. 4, the plow is in its left-hand plowing position in which the plow bottom Pl is in its working position to move earth toward the left, and the left wheels of the tractor are positioned in furrow f2, the direction of movement in FIG. 4 being opposite to that in FIG. 1. Thus in FIG. 4, the tractor and implement 1 are canted to the left as viewed from the rear. Plow bottom Pl opens a furrow f3, and on the subsequent pass of the tractor in the opposite direction to FIG. 4, the right wheels of the tractor will ride in furrow f3. The plow bottoms Pl and Pr are in their transport positions in FIGS. 2 and 3.

With reference to FIG. 5, the implement is again designated collectively by reference numeral 1 and is connected at its forward end with a cross bar 4 mounted between the trailing ends of the lower draft links 2 of a conventional three-point, hydraulic hitch of the tractor T. The rear end of implement 1 is supported on a wheel or ground support assembly 5.

Implement 1 includes an elongated draft frame member 6, preferably of tubular constructions, on which is mounted a forward connecting assembly 8 including a C-shaped bracket 9 having vertically spaced arms 10. Arms 10 of bracket 9 are received between the ends of a pair of vertically spaced arms 12 of a frame member 14 mounted on cross bar 4. Arms 10 and 12 are pivotally connected together by a pin or spindle 15 carried by arms 12. Spindle 15 is non-rotatably secured to frame 14 in the manner shown in the above referred to copending application Ser. No. 524,191.

The wheel assembly 5 is mounted on a bracket 20 secured to the end of a sleeve 19 non-rotatably secured to draft frame member 6 by bolts 21. Brackets 20 is formed with vertically spaced rearwardly projecting arms 22. Rotatably mounted on arms 22 is a spindle 24, and the shaft 28 of a ground wheel 29 is mounted on an arm 25 having its upper end 27 non-rotatably secured to the lower end of spindle 24. Rotation of spindle 24 in arms 22 of bracket 20 causes wheel 29 to turn about the axis of spindle 24.

Wheel 29 is caused to turn about the axis of spindle 24 in accordance with changes in the direction of the draft vehicle by motion transmitting means in the form of a control rod 31 concentrically journalled within draft frame member 6. A beveled pinion gear 32 is mounted on control rod 31 at its forward end and is engaged with a beveled pinion 33 non-rotatably mounted on spindle 15. Mounted on the rear end of control rod 31 is a beveled pinion gear 35 which is engaged with a beveled pinion gear 34 rotatably mounted on spindle 24. Gear 34 is also engaged with a beveled pinion gear 36 rotatably mounted on an actuating member 37. The actuating member 37 is rotatably mounted on spindle 24, and gear 36 is engaged with a beveled gear segment 38 fixed to the upper end of spindle 24 (FIG. 7). The gearing 34, 36, 38 thus constitutes a differential with inputs at 34 and 37 and an output at 38. As draft frame member 6 swings to either side of the longitudinal axis of the tractor about the axis of spindle 15, control rod 31 is caused to rotate by movement of gear 32 around the fixed gear 33, which motion is transmitted to spindle 24 through gears 35, 34, 36 and 38 to cause wheel 29 to turn about the axis of spindle 24 in accordance with changes in the direction of the tractor.

The plow bottoms P, only the right-hand plow bottoms Pr being visible in FIG. 5, are supported on a plow frame 39 including a diagonal beam 43 which is secured intermediate its ends to a frame sleeve 40 rotatably mounted on draft frame member 6. The forward end of beam 43 is secured to one end of a transverse frame member 44 which carries a locking member 45 of the type shown in the aforesaid copending application Ser. No. 524,191. Oppositely projecting arms 50 and 52 carry latching members 50a and 52a, respectively, which are alternately engageable by locking member 45. Locking member 45 is actuated by a hydraulic ram 47 which also actuates the plow frame to rotate about the axis of draft frame 6 between its alternate left and right-hand plowing positions and transport position as fully disclosed in the previously mentioned copending application.

When the plows are in the positions illustrated in FIGS. 1 and 5 with the right-hand plow bottoms in plowing position, the soil forces acting on the plow bottoms tend to cause the draft frame member 6 to swing in a clockwise direction about the axis of spindle 15 such that the draft frame member is inclined relative to the longitudinal axis of the tractor when the tractor is traveling in a straight line. Conversely, when the left-hand plow bottoms are in plowing position as illustrated in FIG. 4, the soil cause the draft frame member 6 to swing in a counterclockwise direction about the axis of spindle 15 as illustrated in FIG. 4 to shift the trailing end of the draft frame 6 to the right of the tractor longitudinal axis. In accordance with the present invention, wheel 29 is automatically actuated to steer the rear end of the draft frame member to the position shown in FIG. 1 when the right-hand plow bottoms are in plowing position, or to the position shown in FIG. 4 when the left-hand plow bottoms are in plowing position.

The mechanism for turning wheel 29 about the axis of spindle 24 to the positions shown in FIGS. 1 and 4 in response to rotation of the frame 39 is shown in detail in FIGS. 6, 7 and 8. The turning mechanism includes an eccentric 60 mounted on sleeve 40 by a plurality of radial spacers 61 of varying lengths. Concentrically mounted on eccentric 60 is a collar 63. A pair of lugs 62 project laterally from collar 63. A clamping ring 64 is mounted on draft frame member 6 to the rear of eccentric 60 and is secured against rotation relative to draft frame member 6 by set screws 65. Projecting laterally from ring 64 is a pair of apertured lugs 66, and a triangular bell crank lever 67 is pivoted by a pin 69 to lugs 66 and by a pin 68 to lugs 62. Bell crank 67 is pivotally connected at 70 to one end of a link 71, the other end of link 71 being pivotally connected at 72 to the arm 73 of the actuating member 37. Actuating member 37 is fulcrumed on spindle 24 and gear 36 is rotatably mounted on the end of an arm 75 formed on member 37.

With reference to FIG. 8, rotation of eccentric 60 about draft tube 6 will cause collar 63 and lugs 62 to shift laterally toward and away from the axis of draft frame 6. Since lugs 66 are held stationary relative to draft frame 6, lever 67 will rotate about pivot pin 69 in a clockwise direction (FIG. 6) as lugs 62 are moved away from the axis of draft tube 6, and in a counterclockwise direction as the lugs 62 move toward draft tube 6. Rotation of bell crank 67 about pin 69 is transmitted through link 71 to actuating member 37 to cause gear 36 to be moved about the axis of spindle 34. If gear 35 remains stationary during this movement of arm 75, gear 34 will likewise be held stationary due to its engagement with gear 35. Therefore, rotation of arm 75 about the axis of spindle 24 will cause gear 36 to rotate about the periphery of gear 34, which rotation will cause gear 38 to rotate spindle 24 depending upon the direction of movement of actuating member 37.

The position of eccentric 60 relative to draft frame tube 6 determines the orientation of wheel 29 relative to draft frame member 6 when the tractor is moving in a straight line. When eccentric 60 is in the position shown in FIG. 8, wheel 29 is turned about the axis of spindle 24 in a direction to steer the trailing end of draft frame member 6 to the left of the tractor longitudinal axis, or the position shown in FIG. 1. When the eccentric is rotated 180 degrees from the position of FIG. 8, the wheel is turned to a position to steer the trailing end of the draft frame member to the right of the tractor longitudinal axis as shown in FIG. 4. When the eccentric 60 is rotated 90 degrees from the position shown in FIG. 8, wheel 29 is in a straight line orientation with the draft frame member 6 to steer the draft frame along the tractor longitudinal axis as shown in FIG. 2.

Since eccentric 60 is mounted on the plow frame sleeve 40, when the right-hand plow bottoms Pr are in the plowing position (the position shown in FIGS. 1 and 5), the plow bottoms tend to throw dirt toward the right and the soil forces tend to swing the rear end of the draft frame to the left about the axis of spindle 15. Therefore, eccentric 60 is oriented with respect to the plow frame sleeve 40 and the rear wheel spindle 24 such that it assumes the position shown in FIG. 8 when the plow frame is in the position shown in FIGS. 1 and 5. Conversely, when the plow frame is rotated 180 degrees to the position shown in FIG. 4, the eccentric causes the wheel to turn in the opposite direction to steer the trailing end of the plow frame to the right-hand side of the tractor axis. As illustrated in FIG. 3, when the tractor turns toward the right, the wheel is caused to turn in the direction shown in phantom lines due to the engagement of gear 32 with the fixed gear 33 on spindle 15 (FIG. 7). Conversely, turning of the tractor toward the left causes the wheel to turn in the opposite direction to the full line position shown in FIG. 3. This turning movement of the wheel relative to the tractor occurs in any position of the plow frame due to the engagement of gear 32 with gear 33.

While a specific form of the invention is illustrated and described in the foregoing specification and accompanying drawings, it should be understood that the invention is not limited to the exact construction shown but that various alternatives in the construction and arrangement of parts will become apparent to those skilled in the art without departing from the scope and spirit of the invention.

I claim:

1. A multi-bottom turnover plowing implement of the semi-mounted type adapted to be drawn and controlled from a tractor having a power elevated hitch linkage and an auxiliary source of manually controlled power for operation of a remote actuator, comprising in combination a longitudinally extending frame having trunnion means forming a support for an oscillatable plow carrier, means at the forward end of the frame for attaching the implement to a tractor hitch linkage and including a vertical pivot and a transverse pivot, an oscillatable plow carrier mounted on the trunnion means, two arrays of plows of opposite hand fixed to the carrier, an actuator powered and controlled from the tractor and connected between the frame and the carrier to shift the carrier between either of two plowing positions and an intermediate transport position, means including a tail wheel to support the rear end of the frame at a fixed distance above the furrow made by the rearmost plow of either array, and at substantially the same distance above the ground when the carrier is in transport position, means forming a vertical pivot at the rear of the frame about which the tail wheel may oscillate, a first steering mechanism between the tail wheel and the hitch and connected to swing the rear of the implement to the side away from which the tractor is turned and a second steering mechanism between the plow carrier and the tail wheel and connected to oppose in an amplified ratio the steering movements of the tail wheel produced by the first steering mechanism as the implement engages the soil and the rear end swings toward the land side under the influence of lateral forces on the working array of plows, the second steering mechanism including a differential gearing connected between the first steering mechanism, the second steering mechanism and the tail wheel.

References Cited

UNITED STATES PATENTS 2,561,032  7/1951  Onfrey _____ 172—212
2,732,781  1/1956  Coviello _____ 172—212

FOREIGN PATENTS 1,051,487  1/1954  France.

ROBERT E. PULFREY, Primary Examiner
JAMES W. PETERSON, Assistant Examiner

U.S. Cl. X.R.

172—285, 291